UNITED STATES PATENT OFFICE.

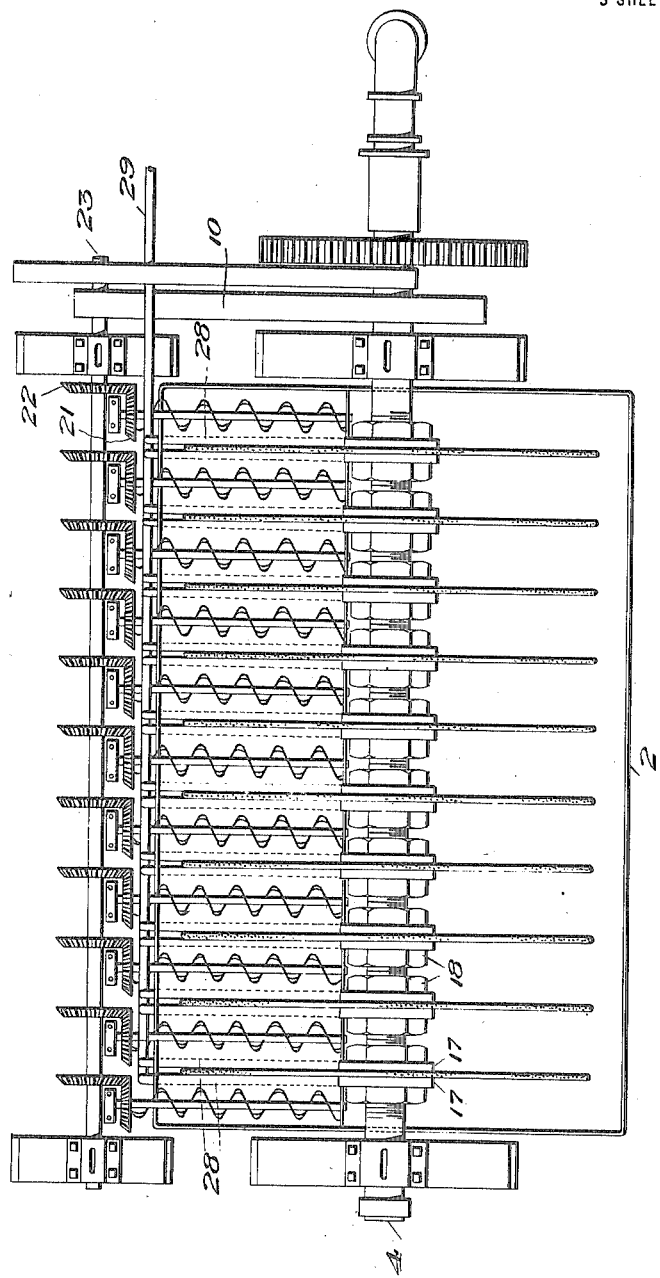

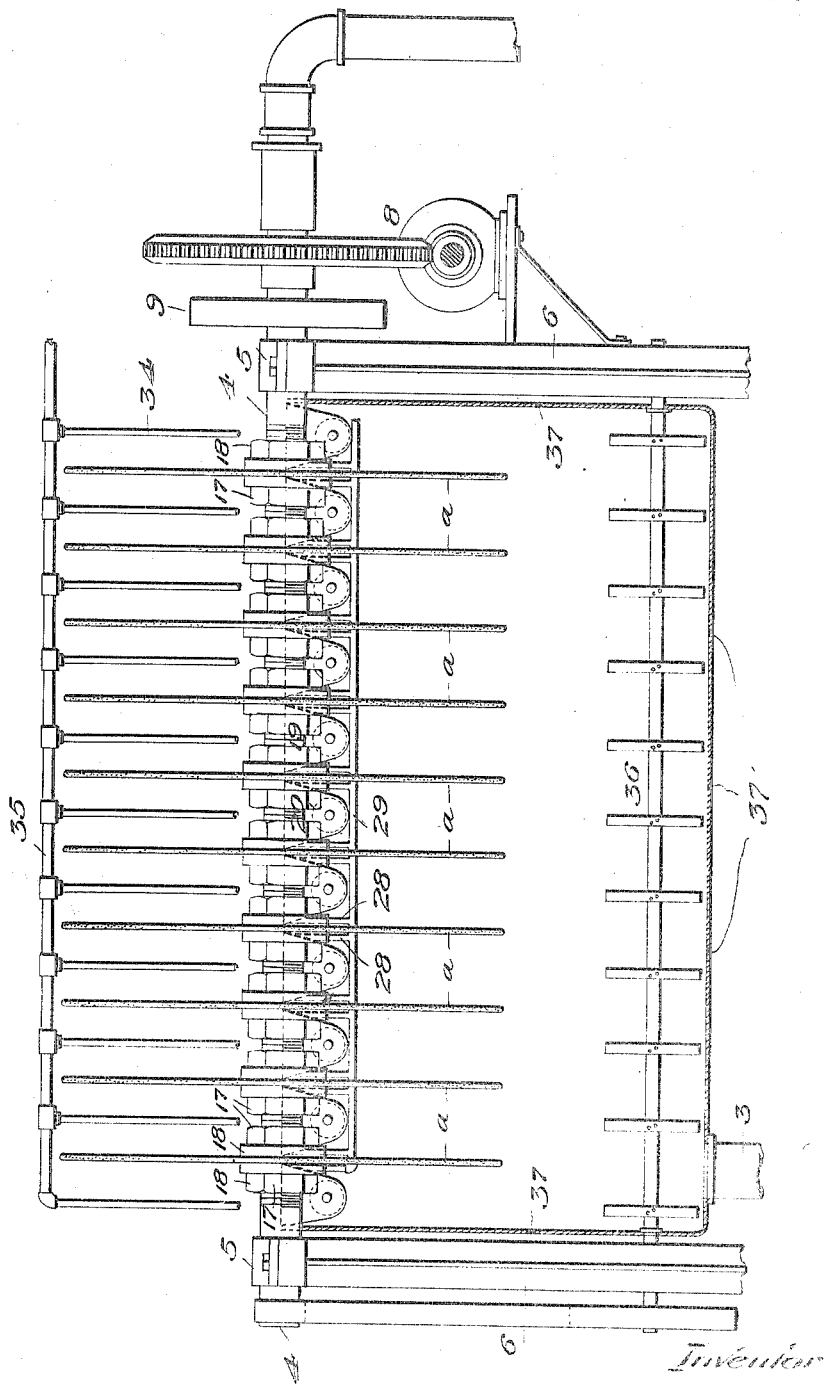

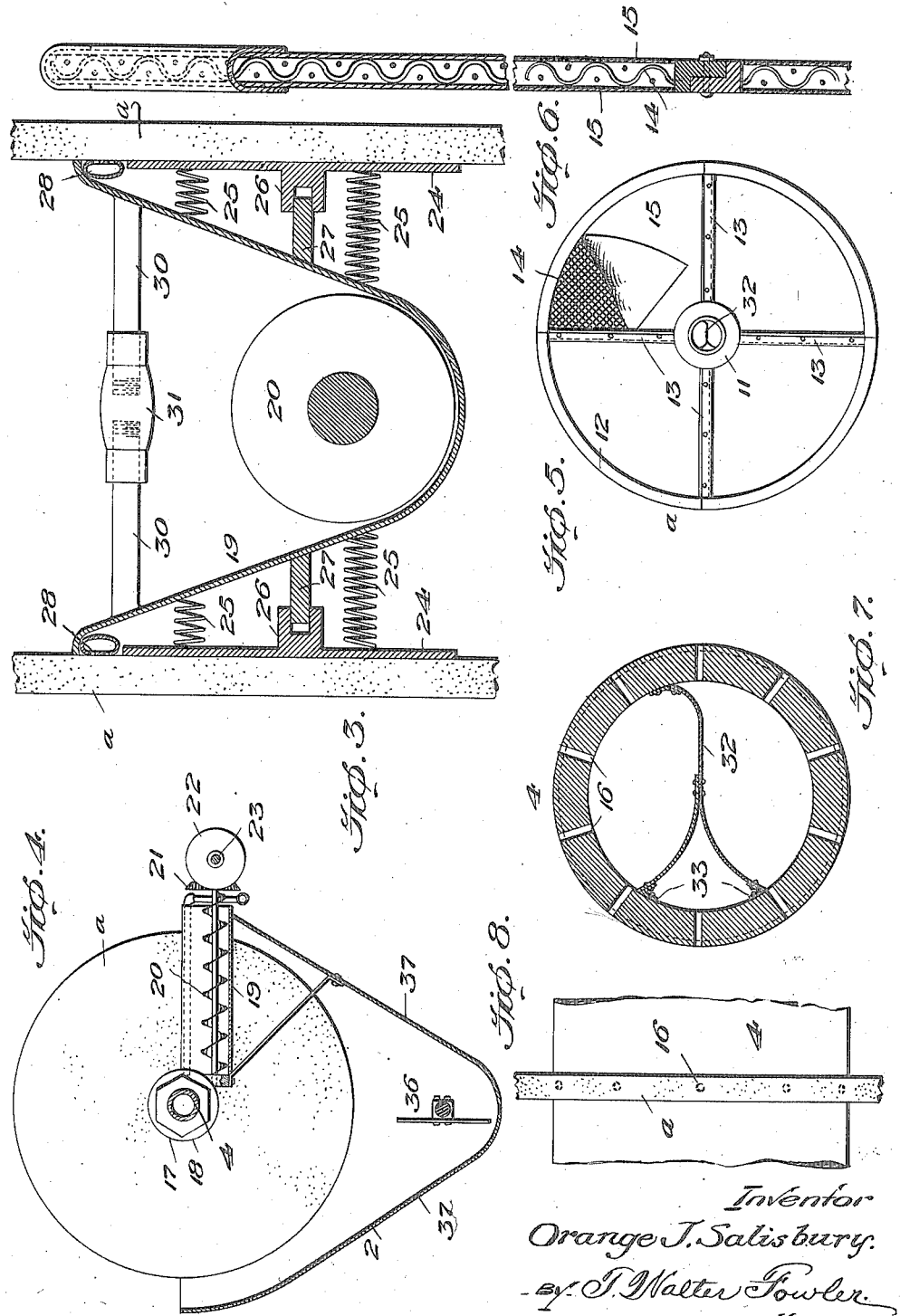

ORANGE JAMES SALISBURY, OF SALT LAKE CITY, UTAH, ASSIGNOR TO UNITED FILTERS CORPORATION, OF SALT LAKE CITY, UTAH, A CORPORATION OF DELAWARE.

FILTERING APPARATUS.

1,283,925.  Specification of Letters Patent.  Patented Nov. 5, 1918.

Application filed March 3, 1917. Serial No. 152,440.

*To all whom it may concern:*

Be it known that I, ORANGE J. SALISBURY, a citizen of the United States, residing at Salt Lake City, in the county of Salt Lake and State of Utah, have invented certain new and useful Improvements in Filtering Apparatus, of which the following is a specification.

My invention relates to an apparatus designed primarily to separate slimes from which precious metals have been dissolved and the liquid which holds the precious metals in solution. In the cyanid process, for example, when gold or silver bearing slimes are mixed or brought into contact with the cyanid solution, the precious metals are dissolved and carried in the liquid in a state of solution.

To effect a separation of the metal-laden solution from the solid matter, by means of an improved filtering apparatus of the rotary suction open-leaf type, is the essential object of the present invention.

While my invention has been found particularly useful for metallurgical work, it is not, however, limited to this use, since it may be successfully employed in other fields and substantially wherever the separation of solids from liquid matter is desired. It will be understood, therefore, that the filtering apparatus which I am about to describe, is capable of almost universal use in the art of filtration and hence I may employ it in the filtration of mineral bearing slimes, and also in filtering saccharine solutions, chemicals, or wherever it is purposed to separate a liquid from a solid and to discharge the solid matter which has accumulated upon the outside of the filtering medium during the filtering process.

With the above and other objects in view my invention consists of the parts and the constructions, arrangements and combinations of parts which I will hereinafter describe and claim.

In the accompanying drawing forming part of this specification and in which similar reference characters indicate like parts in the several views—

Figure 1 is a plan view of a filtering apparatus embodying my invention.

Fig. 2 is a side elevation of the same showing parts in section.

Fig. 3 is an enlarged cross-section of a scraper, showing portions of adjacent filter-leaves, between which the scraper is located.

Fig. 4 is a detail showing in cross-section one of the troughs for solids and showing a filter leaf and scraper in elevation.

Fig. 5 is a plan view partially broken away, of one of the filter-leaves.

Fig. 6 is an enlarged section on the line X—X of Fig. 5.

Fig. 7 is a cross sectional detail of the hollow shaft, 4, showing an internal diaphragm or spider.

Fig. 8 is a side elevation of a fragment of the shaft, 4, showing a portion of a filter-leaf in dotted lines.

In carrying out my invention, I may employ the active filter agents in connection with an appropriate tank, 2, of any suitable capacity and which is open at the top, since the tank is a part of an apparatus of the type known as the rotary suction filter, said tank having in its bottom a suitable inlet, 3, by which the slimes or material to be filtered is admitted to said tank, and in which tank the material rises until a substantial part of the lower portions of the filtering agents will be submerged. The depth of the material in the tank may be regulated and maintained in any manner well known in the art, but this forms no particular part of the present invention.

Extending longitudinally along the top of the tank, 2, is a hollow shaft, 4, which is mounted in appropriate bearings, 5, on the top of uprights or pillow-blocks, 6, said shaft being provided with appropriate means whereby rotation may be imparted to it. In the present case this means is shown as including a worm-drive mechanism, 8, and a band-wheel, 9, from which latter power may be derived through the medium of a belt, 10, to drive the scraper elements, which I will hereinafter describe.

Arranged on the horizontal hollow shaft, 4, is a series of filter elements, these elements being in the form of disks, *a*, and which include inner and outer rims, 11—12, and connecting spokes or arms, 13, as shown in Fig. 5, the space between the spokes being occupied by corrugated or foraminous plates, 14, which form an internal backing for the outer covering or sides, 15, of some suitable filtering fabric which is fixed thereto in any well known and appropriate manner. Thus, the filtering elements which I will hereafter refer to, as filter leaves, are arranged side by side on the shaft, in spaced relation, so that they occupy substantially the entire length of the tank in which they operate, the assemblage of the components of each of the filter leaves being such that the interior of the leaves communicate with the interior of the hollow shaft through perforations, 16, which are formed in said shaft at points connecting with the inner circumference of the inner rims of said leaves, whereby the filtrate which is drawn through the filtering sides of the leaves will pass from the interior of said leaves through said perforations and into the hollow shaft, and from which it is discharged exterior to the machine in any appropriate manner.

I also prefer to form the filter leaves of sections which may be done by dividing the leaves transversely, substantially as shown in Fig. 6, whereby one or more of the sections of a leaf may be separated and removed and a new section or leaf substituted without disturbing any of the other leaves of the filter. This I regard as a feature of some importance in a filter of the rotary type, such as I have herein indicated.

In order that the filter leaves may be appropriately secured in position on the hollow shaft, 4, I externally thread this shaft and upon the threaded portions I mount suitable washers, 17, which are designed to clamp a filter leaf between them and I back against these washers suitable nuts, 18, which are threaded into engagement with said shaft, as clearly indicated in Fig. 1. This arrangement allows me to unscrew the nuts holding any particular filter leaf, to thereby loosen the adjacent washers and permit the removal of the leaf, or a section thereof, and the introduction of a section or of a new leaf, and then the tightening of the parts to firmly secure said leaf in place, as will be well understood by those skilled in the art.

The lower portions of the filter leaves are intended to be submerged in the fluid contents of the tank, and as the hollow pipe is designed to be connected with some appropriate suction machine, pump or otherwise, not shown, it will be apparent that a strong suction will be supplied through the perforations, 16, of the shaft to the interiors of the filter leaves with the result that the clear filtrate will be drawn into the filter leaves and then discharged through the pipe, as aforesaid, while the solids in the material being treated, will be deposited on the outer sides of the filtering cloth in the form of a thin cake. These solids are designed to be progressively removed and to this end I propose to employ in connection with the already described parts, some appropriate form of scraping mechanism which will operate against the outer or filtering sides of the upper and unsubmerged portions of the revoluble filter-leaves and scrape the solid deposit therefrom, so that these filtering surfaces are practically cleansed before they are again submerged in the fluid contents of the tank.

One form of scraping mechanism I illustrate in the present drawing, and this consists in locating suitable troughs or pans, 19, between adjacent filter-leaves, which troughs are preferably composed of light steel having their sides diverging upwardly so that the top edges of the sides will be substantially in contact with the outer sides of the filter leaves and will act as scrapers to remove the sedimentary deposit on the leaves during the rotation of said leaves. The top edges of the troughs, 19, are substantially horizontal, as shown in Fig. 4, and extend from the inner circumference of the filter leaves to a point beyond the outer circumference of said leaves, and as the troughs are designed to be held stationary relatively to the rotatable filter leaves, it will be apparent that as the leaves rotate downwardly, the upper edges of the troughs serve as blades or scrapers for dislodging the caked material on the filtering sides of the leaves and directing the removed material into the trough, which material may then be discharged outwardly along the trough and beyond the tank, by some suitable form of conveyer, the one herein shown being a screw conveyer, 20, operated by a beveled gear, 21, which is in mesh with a similar gear, 22, on a shaft, 23, extending longitudinally of the machine and driven by the belt, 10, before mentioned.

While this construction is well adapted for my purpose, I wish it understood that I do not limit myself to this particular form of scraping mechanism but that the broader features of my invention may be used in connection with any other and appropriate means for displacing and carrying from the machine the sedimentary matter which is formed on and removed from the filtering surfaces of the leaves.

Referring to Fig. 3, it will be seen that in connection with the trough, 19, I employ suitable plates, 24, which are backed by suitable compression or other springs, 25, interposed between the plates and the outer sides of the trough, said plates being provided with grooved lugs, 26, to receive projections, 27, on the sides of the trough, said plates which may be termed "covering-flaps", being mounted at the sides of the filter leaves below the scraping edges thereof and adapted to serve the purpose of preventing a short circuiting or loss of vacuum from that portion of the filter leaves from which the cake or deposited matter has just been removed by the scraping edges of the trough, and before this cleaned portion of the filter surface is again submerged in the pulp contents of the tank.

I also show in Fig. 3, just under the scraping edges of the trough, suitable flattened tubes, 28, which are perforated on the sides adjacent the filtering sides of the leaves, said tubes as shown in Fig. 1, extending outwardly parallel with the troughs and having their outer ends connected to a pipe, 29, which extends longitudinally of the outer side of the tank, and is adapted to be connected with a source of air supply under pressure. The purpose of this is that compressed air or other gaseous medium may be used in addition to the mechanical scraper for removing the cake material from the filter leaves. The perforations in the flattened tubes extend substantially the entire length thereof so as to operate upon the entire filtering surface of a leaf during a complete revolution of said leaves.

In order that I may increase or decrease the tension of the scraping edges against the sides of the filter leaves, I also connect said edges with the upper sides of the troughs, 19, by means of rods, 30, and connecting turnbuckles, 31, this construction forming an adjustable spreader for the purpose stated.

Referring to Fig. 7, it will be seen that a stationary spider, 32, is located interior to the hollow and perforated shaft, 4, and may have curved edges provided with rubber or other flaps or packings, 33, which serve to prevent leakage of filtrate around the spider. As the filter-leaves slowly revolve the filter cake forms on the exterior of the filter leaves and as the coated surfaces of the leaves reach a position above the level of the pulp in the tank, I prefer to wash the cakes, and this may be done by spraying water on the surface of the cakes, through appropriate perforated or spray pipes, 34, Fig. 2, which connect with a main supply pipe 35, the wash water because of the suction applied to the hollow shaft, being drawn through the cakes and through the upper sides of the filter leaves and escaping through the perforations, 16, in the pipe, 4, and being conducted through the upper half or portion of said pipe, as shown in Fig. 7, and which portion is separated from the lower or filtrate conducting portion of said pipe, by means of the stationary spider, 32, before described. Since the central shaft revolves and the interior spider is stationary, it will be readily seen that the original filtrate and the wash-water are thus kept in separate channels and can be so conveyed to any proper receptacles, and there will be no admixture of these liquids as there is practically no leakage past the edges of the spider, because of the existing flaps or packing, 33, before mentioned.

In order that the pulp admitted to the bottom of the tank through the inlet may be kept constantly agitated to effect a better commingling of the fluid and solid portions of the pulp, I locate in the bottom of the tank some suitable form of agitator, 36, and if desired, I may assist the action of this agitator by admitting air through appropriate inlets, 37, in the tank.

A cycle of operations of the before described apparatus may be briefly stated as follows:

The tank is supplied with pulp until the level of the pulp is near the top of the tank, suitable appliances being employed, if desired, to maintain this level. Suction is applied to the inside of the filter leaves through the medium of the hollow shaft, 4, and some suitable suction-producing appliance with which it is connected, and rotation is given the shaft through the driving devices and as the filter leaves are slowly rotated through the pulp contents of the tank, the filtrate will be drawn through the part of the leaves which is submerged in the pulp, and this separated liquid will be drawn into the shaft, 4, and will then be conveyed through the separate lower conduit of said shaft. As the leaves slowly rotate the cake is formed on the exterior of the filter element, and as the cake reaches a position above the pulp it is subjected to the action of the wash-water which is sprayed against the surface of the cake, said wash-water being conducted from the interior of the filter leaves to the upper conduit of the hollow suction pipe, 4, to its appropriate receiver. After washing, the deposited cakes come in contact with the scraping edges of the troughs and the removed deposits fall into the bottom of the troughs and are finally removed exterior of the machine by means of the conveyer operating in the bottom of said trough. In the meantime the pulp in the tank may be maintained in a state of agitation by the means before described, or by any other means, so that there is always an intimate admixture of the components of the material being treated.

Among the advantages of my apparatus is that I employ a novel method of keeping the filtrate and wash-water separate without requiring the use of complicated valves; also the large filter area which I obtain with a comparatively small floor space. More especially, however, the construction described enables me to produce a continuous suction filter wherein the filter leaves are constructed in such manner that any one of the leaves, or a section thereof, may be readily taken out or dissociated from the remaining elements and a new filter leaf substituted in its place with the loss of comparatively little time. Further, by the use of the plates, 24, which serve to cover a portion of the cleaned sides of the filter leaves which have passed the scraping edges of the troughs, I have devised a means for preventing an appreciable loss of vacuum due to short circuiting of air through the portion of the filter elements that have been scraped clean of caked material.

Having thus described my invention what I claim as new and desire to secure by Letters Patent is:—

1. In a filtering apparatus, the combination with a tank adapted to contain the fluid to be filtered, of a rotatable suction shaft mounted above the liquid contents of the tank having a filtrate conduit, a filter leaf fixed to the shaft and rotatable therewith, said leaf having its lower portion adapted to be submerged in the liquid contents of the tank, and having its interior connecting with said filtrate conduit, a stationary scraper located above the liquid contents of the tank and adapted to remove deposited material from an unsubmerged portion of said leaf, and conveying means for the material removed by the scraper.

2. The combination with a tank adapted to contain fluid to be filtered, of a rotatable suction shaft extending along the upper portion of the tank having a series of sectional filter leaves arranged thereon in spaced relation, said shaft having a filtrate conduit, scraping devices associated with said filter leaves adapted to remove solids deposited upon said leaves, and independent securing devices between adjacent leaves permitting the sliding movement endwise of the shaft of any of the leaves without disturbing the others.

3. The combination with a tank adapted to contain fluid to be filtered, of a rotatable suction shaft extending along the upper portion of the tank having a series of filter leaves arranged thereon in spaced relation, said shaft having a filtrate conduit, scraping devices associated with said filter leaves adapted to remove solids deposited upon the unsubmerged portions of said leaves, and independent securing devices for each of said leaves permitting the removal of any of the leaves without disturbing the others, said leaves being formed of separable sections, and said securing devices being mounted on said shaft between adjacent leaves and formed of laterally separable members.

4. The combination with a tank adapted to contain fluid to be filtered, of a rotatable suction shaft extending along the upper portion of the tank having a series of sectional filter leaves arranged thereon in spaced relation, said shaft having a filtrate conduit, scraping devices associated with said filter leaves adapted to remove solids deposited upon the unsubmerged portions of said leaves, and independent securing devices for each of said leaves permitting the removal of any of the leaves without disturbing the others, said securing devices comprising clamping washers on said shaft one upon each side of a filter leaf, and nuts adjustable on said shaft for holding the washers in position against said leaves.

5. The combination with a tank adapted to contain fluid to be filtered, of a rotatable suction shaft extending along the upper portion of the tank having a series of sectional filter leaves arranged thereon in spaced relation, said shaft having a filtrate conduit, scraping devices associated with said filter leaves adapted to remove solids deposited upon the unsubmerged portions of said leaves, and independent securing devices for each of said leaves permitting the removal of any of the leaves without disturbing the others, said securing devices comprising clamping washers on said shaft one upon each side of a filter leaf, and nuts adjustable on said shaft for holding the washers in position against said leaves, said shaft being externally threaded for the engagement of said nuts.

6. In a filtering apparatus, the combination with a tank adapted to contain material to be filtered, of a rotatable suction shaft mounted in the upper portion of a tank above the fluid contents thereof, said shaft being externally threaded and having an internal conduit for liquid filtrate, a series of sectional filter leaves on said shaft, and independent threaded fastening elements for each of said leaves holding the leaves in spaced relation and permitting the removal of any leaf without disturbing the others, each of said leaves having its interior communicating with said filtrate conduit, and means associated with said leaves and operating to remove deposited material from unsubmerged portions thereof.

7. In a filtering apparatus, the combination with a tank adapted to contain material to be filtered, of a rotatable suction shaft mounted in the upper portion of the tank above the fluid contents thereof, said shaft being externally threaded and having an internal conduit for liquid filtrate, a series of filter leaves on said shaft, and independent fastening elements for each of said leaves holding the leaves in spaced relation and permitting the removal of any leaf without disturbing the others, each of said leaves having its interior communicating with said filtrate conduit, means associated with said leaves and operating to remove deposited material from unsubmerged portions thereof, and a wash-fluid pipe having perforated branches extending between unsubmerged portions of adjacent leaves adapted to spray the deposited solids on the unsubmerged portions of the leaves, said shaft having a second conduit communicating with the interior of the filter leaves and adapted to convey the wash fluid separate from the original filtrate.

8. The combination of a fluid-containing tank, of a rotatable suction shaft mounted above the fluid contents of the tank and having a filter leaf fixed thereto, and means located above the tank adapted to discharge a wash-fluid against deposited solids on the unsubmerged portion of the filter leaf, said shaft having its interior divided in separate conduits each of which is adapted to communicate with the interior of the filter leaf whereby the original filtrate and the wash-fluid may be delivered through the separate conduits of the shaft.

9. In filtering apparatus, the combination with a tank adapted to contain the fluid to be filtered, of a rotatable suction shaft mounted in the upper portion of the tank having a series of filter leaves fixed thereto in spaced relation, said shaft having radial fluid inlets connecting with the interiors of the filter leaves, and a stationary spider interior to the shaft and dividing said interior into non-communicating passages, certain of the fluid inlets of the shaft communicating with one of said passages, and certain of the other inlets communicating with the other passages, the first-named inlets adapted to connect with those portions of the filter leaves which are submerged and the other inlets adapted to connect with the portions of the filter leaves which are unsubmerged, and means for removing deposited material from the unsubmerged surfaces of the filter leaves.

10. In filtering apparatus, the combination with a tank adapted to contain the fluid to be filtered, of a rotatable suction shaft mounted in the upper portion of the tank having a series of filter leaves fixed thereto in spaced relation, said shaft having radial fluid inlets connecting with the interiors of the filter leaves, and a stationary spider interior to the shaft and dividing said interior into non-communicating passages, certain of the fluid inlets of the shaft communicating with one of said passages, and certain of the other inlets communicating with the other passage, the first-named inlets adapted to connect with those portions of the filter leaves which are submerged and the other inlets adapted to connect with the portions of the filter leaves which are unsubmerged, and means for removing deposited material from the unsubmerged surfaces of the filter leaves, and pipes adapted to spray a cleansing fluid against the deposited material on unsubmerged portions of the filter leaves.

11. A continuous, rotary suction filter comprising a fluid-containing tank, a suction shaft mounted above the liquid contents of the tank and having a series of filter leaves fixed thereon in spaced relation, said shaft having fluid inlets communicating with the interior of said leaves and through which inlets the filtrate enters the suction shaft, and a scraping mechanism located between each pair of filter leaves adapted to continuously remove deposited solids on unsubmerged portions of the leaves, said scraping mechanism comprising stationary troughs having edges adapted to contact with the deposited material, and conveying devices operating in said troughs.

12. A continuous, rotary suction filter comprising a fluid-containing tank, a suction shaft mounted above the liquid contents of the tank and having a series of filter leaves fixed thereon in spaced relation, said shaft having fluid inlets communicating with the interior of said leaves and through which inlets the filtrate enters the suction shaft, and a scraping mechanism located between each pair of filter leaves adapted to continuously remove deposited solids on unsubmerged portions of the leaves, said scraping mechanism comprising troughs having flexible sides terminating in scraping edges disposed adjacent the coated surfaces of unsubmerged portions of the filter leaves, means for increasing or decreasing the tension of the scraping edges against the sides of the filter leaves, and conveying devices operating in said troughs below said scraping edges.

13. In filtering apparatus, the combination with a tank adapted to contain the fluid to be filtered, of a rotatable suction shaft mounted in the upper portion of the tank having a series of filter leaves fixed thereto in spaced relation, said shaft having radial fluid inlets connecting with the interiors of the filter leaves, and a stationary spider interior to the shaft and dividing said interior into non-communicating passages, certain of the fluid inlets of the shaft communicating with one of said passages, and certain of the other inlets communicating with the other passage, the first-named inlets adapted to connect with those portions of the filter leaves which are submerged and the other inlets adapted to connect with the portions of the filter leaves which are unsubmerged, means for removing deposited material from the unsubmerged surfaces of the filter leaves, pipes adapted to spray a cleansing fluid against the deposited material on unsubmerged portions of the filter leaves, and plates yieldingly held against the sides of the filter-leaf below the scraping edges thereof adapted to prevent short-circuiting or loss of vacuum from that portion of the filter leaf from which the scraping edges have removed the deposited material.

14. A rotary suction filter, comprising a fluid-containing tank, a rotary suction-shaft having a series of spaced filter leaves fixed thereto and rotatable therewith, said leaves having their lower portions adapted to be submerged in the fluid contents of the tank, and said shaft having its interior divided into separate conduits each of which communicates with the interior of the filter-leaves, scraping devices operable in contact with unsubmerged portions of the filter leaves containing deposited solids, means serving to cover unsubmerged cleaned portions of the filter leaves to prevent a short-circuiting or loss of vacuum from said cleaned portions, means maintaining the fluid contents of the tank in a state of agitation, and spray pipes arranged between the unsubmerged portions of adjacent filter leaves adapted to spray the coated surfaces thereof with a wash-fluid.

15. A rotary suction filter comprising a fluid containing tank, a rotatable suction shaft having filter leaves whose lower portions are submergible in the fluid contents of the tank, said leaves having divided frames and filtering sides, independent fastenings for the filter leaves permitting removal of any leaf without disarranging the others, means for removing caked material from the surfaces of the filter leaves, and means for removing deposited solids while they are being carried on the unsubmerged portions of said leaves.

In testimony whereof I affix my signature.

ORANGE JAMES SALISBURY.